United States Patent [19]
Iizawa

[11] Patent Number: 5,801,756
[45] Date of Patent: Sep. 1, 1998

[54] MULTIPOINT VIDEO CONFERENCE SYSTEM

[75] Inventor: Junichi Iizawa, Tokyo, Japan

[73] Assignee: NEC Corporation, Tokyo, Japan

[21] Appl. No.: 563,114

[22] Filed: Nov. 27, 1995

[30] Foreign Application Priority Data

Nov. 25, 1994 [JP] Japan .................................. 6-291087

[51] Int. Cl.$^6$ .................................................... H04N 7/14
[52] U.S. Cl. .............................. 348/16; 348/15; 370/266
[58] Field of Search ............................ 379/53, 54, 202; 348/15, 16, 17; 370/260, 261, 263, 265–269; 395/330, 200.04, 200.34; 381/119; 345/330

[56] References Cited

U.S. PATENT DOCUMENTS

| | | | |
|---|---|---|---|
| 4,271,502 | 6/1981 | Goutmann et al. | 370/261 |
| 4,479,211 | 10/1984 | Bass et al. | 370/261 |
| 4,650,929 | 3/1987 | Boeger et al. | 348/15 |
| 4,658,398 | 4/1987 | Hsing | 379/202 |
| 5,382,972 | 1/1995 | Kannes | 348/15 |
| 5,638,114 | 6/1997 | Hatanaka et al. | 348/15 |
| 5,675,374 | 10/1997 | Kohda | 348/15 |

OTHER PUBLICATIONS

Tanigawa et al. "Personal Multimedia–Multipoint Teleconference System", 1991, IEEE Infocom '91, The Conference on Computer Communications Proceedings vol. 3.

*Primary Examiner*—Curtis A. Kuntz
*Assistant Examiner*—Stephen Wolff Palan
*Attorney, Agent, or Firm*—Sughrue, Mion, Zinn, Macpeak & Seas, PLLC

[57] ABSTRACT

A multipoint video conference system includes a plurality of conference terminals, placed at remote points in correspondence with participants in a conference, for transmitting/receiving speech and image signals from/to the participants, and a video conference controller for transmitting/receiving speech and image signals to/from the conference terminals. The video conference controller includes an audio mixer, an identifying section, a frame selecting section, and multiplexers. The audio mixer forms a synthetic speech signal by synthesizing speech signals from the conference terminals. The identifying section detects speech signals from the conference terminals and identifies the conference terminal through which the participant has made utterance. The frame selecting section forms a multi-image signal by selecting image signals equal in number to multiple frames from the image signals from the conference terminals on the basis of the identification result obtained by the identifying section. The multiplexers receive the speech and image signals from the conference terminals and transmit the synthetic speech signal from the audio mixer and the multi-image signal from the frame selecting section to the conference terminals.

10 Claims, 2 Drawing Sheets

MULTIPOINT VIDEO CONFERENCE SYSTEM

BACKGROUND OF THE INVENTION

The present invention relates to a multipoint video conference system for synthesizing frames from terminals placed at a plurality of points and displaying the resultant image as a synthetic frame.

In general, a multipoint video conference system of this type is constituted by one conference controller and a plurality of conference terminals placed at a plurality of points. Each terminal has speech and image transmission functions and an image display function. In the conventional multipoint video conference system having the above arrangement, when a given participant in a video conference makes utterance through a terminal assigned to him/her, the speech signal is sent to the conference controller. In this case, the conference controller synthesizes this speech signal with speech signals from other terminals, and sends back the resultant signal to each terminal. Upon reception of an image signal from the terminal at each point, the conference controller synthesizes this image signal with image signals from other terminals, as in the case of the speech signals, to form a synthetic frame consisting of multiple frames, and sends back this synthetic frame to each terminal to display it.

In the conventional multipoint video conference system, the number of multiple frames constituting a synthetic frame is fixed in advance. If, therefore, the number of terminals assigned to the respective participants in a conference is larger than that of multiple frames, some of images from the terminals cannot be displayed. In order to solve this problem, the operator at each terminal may perform a selecting operation to select one of combinations of the constituent images of multiple frames in accordance with the operated state of a conference. In such a scheme, the operator at each terminal is burdened with an additional operation.

SUMMARY OF THE INVENTION

It is an object of the present invention to provide a multipoint conference system for automatically synthesizing images from terminals placed at points where the terminals are used by participants in a conference, when the number of terminals exceeds the predetermined number of frames constituting a synthetic frame.

In order to achieve the above object, according to the present invention, there is provided a multipoint video conference system comprising a plurality of conference terminals, placed at remote points in correspondence with participants in a conference, for transmitting/receiving speech and image signals from/to the participants, and a video conference controller for transmitting/receiving speech and image signals to/from the conference terminals, the video conference controller comprising speech synthesizing means for forming a synthetic speech signals by synthesizing speech signals from the conference terminals, identifying means for detecting speech signals from the conference terminals and identifying the conference terminal through which the participant has made utterance, frame selecting means for forming a multi-image signal by selecting image signals equal in number to multiple frames from the image signals from the conference terminals on the basis of the identification result obtained by the identifying means, and transmission/reception means for receiving the speech and image signals from the conference terminals and transmitting the synthetic speech signal from the speech synthesizing means and the multi-image signal from the frame selecting means to said conference terminals.

DESCRIPTION OF THE PREFERRED EMBODIMENT

The present invention will be described below with reference to the accompanying drawings.

Figure 1:
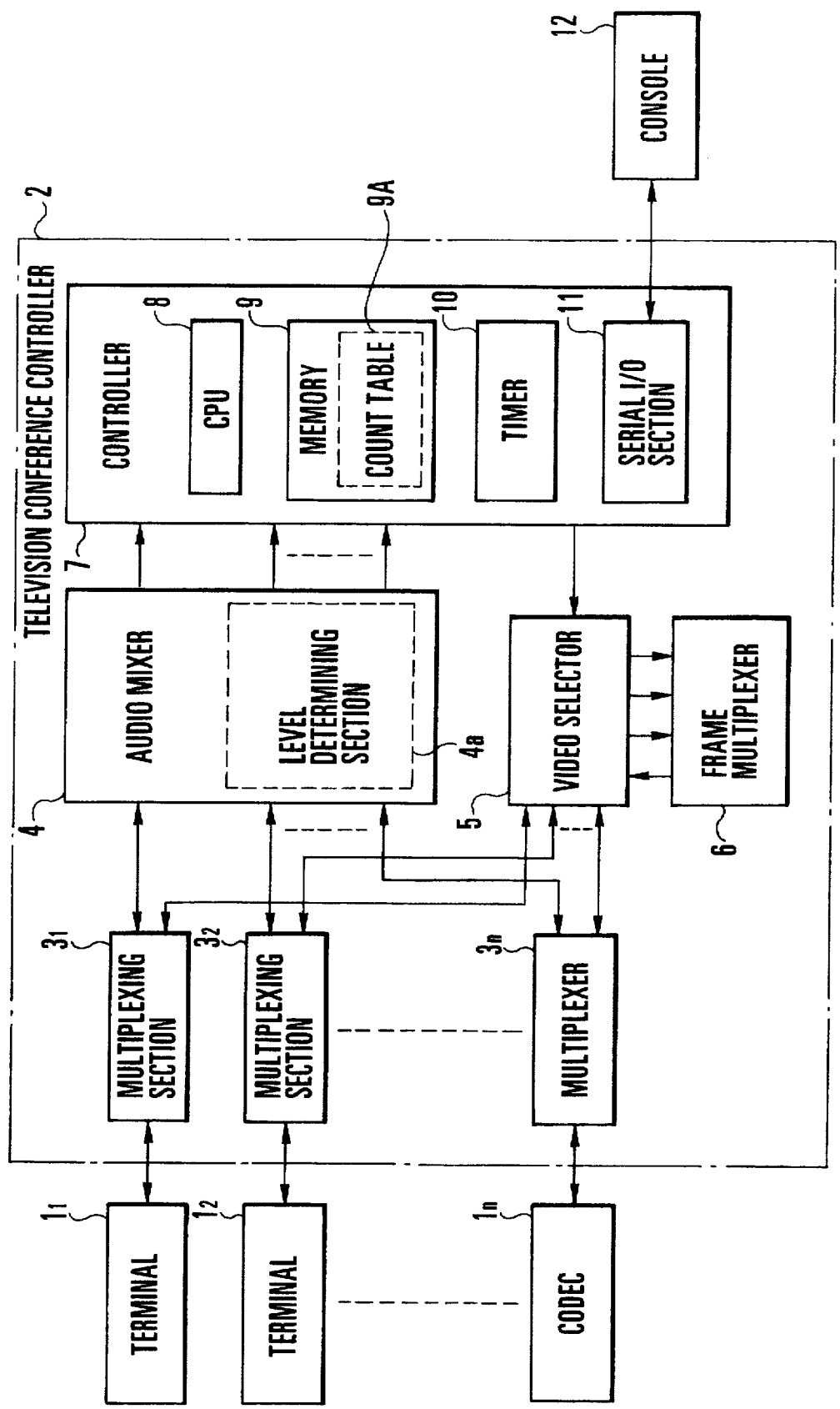
FIG. 1 is a block diagram showing a multipoint video conference system according to an embodiment of the present invention.

FIG. 1 shows a multipoint video conference system according to an embodiment of the present invention. This multipoint video conference system is constituted by a plurality of CODECs (coder-decoders) $1_1$ to $1_n$ as conference terminals respectively placed at remote points to transmit speech and images of participants in a video conference, and a video conference controller 2 for processing the speech and image signals from the CODECs $1_1$ to $1_n$ and sending back the resultant signal to each of the CODECs $1_1$ to $1_n$.

The video conference controller 2 includes multiplexers $3_1$ to $3_n$ for multiplexing and separating speech and image signals, an audio mixer 4 for adding the speech signals separated by the multiplexers $3_1$ to $3_n$, a video selector 5 for selecting some of the image signals separated by the multiplexers $3_1$ to $3_n$ and sending back a synthetic image signal to each of the multiplexers $3_1$ to $3_n$, a frame multiplexer 6 for forming multiple frames by synthesizing the image signals selected by the video selector 5, and a controller 7 for controlling the audio mixer 4 and the video selector 5. The audio mixer 4 includes a level determining section 4a for determining the levels of the speech signals separated by the multiplexers $3_1$ to $3_n$ and outputting the determination signals to the controller 7.

The controller 7 includes a CPU (Central Processing Unit) 8 for performing signal processing control in accordance with a predetermined procedure, a memory 9 having a count table 9A for storing utterance times of participants in a conference in correspondence with the CODECs $1_1$ to $1_n$, a timer 10 for counting the detection periods of utterance/non-utterance states of the participants and the like, and a serial I/O section 11 for interfacing with input/output serial data. An external console 12 is connected to the serial I/O section 11.

The schematic operation of the video conference system having the above arrangement will be described next.

Multiplexed speech and image signals are transmitted from the CODECs $1_1$ to $1_n$ placed at remote points to the video conference controller 2. The multiplexed signals from the CODECs $1_1$ to $1_n$ are separated into speech signals and image signals by the multiplexers $3_1$ to $3_n$. The separated speech signals are output to the audio mixer 4. The separated image signals are output to the video selector 5.

The audio mixer 4 adds and mixes the speech signals from the multiplexers $3_1$ to $3_n$ and outputs the mixed speech signal to the multiplexers $3_1$ to $3_n$. The mixed speech signal is multiplexed with a synthetic image signal by the multiplexers $3_1$ to $3_n$. The resultant signal is then transmitted to the CODECs $1_1$ to $1_n$. The level determining section 4a of the audio mixer 4 determines the levels of the speech signals from the CODECs $1_1$ to $1_n$ and outputs the resultant signals as binary signals to the controller 7.

For example, the image signal output from the CODEC $1_1$, which is separated by the multiplexer $3_1$ and sent to the video selector 5, is selectively output from the video selector 5 to the frame multiplexer 6. In this case, the frame multiplexer 6 performs frame synthesis of the image signal from the multiplexer $3_1$ and the image signals from the remaining multiplexers $3_2$ to $3_n$, which are output from the CODECs $1_2$ to $1_n$, to form independent constituent frames which are displayed as one frame by a display unit. That is, the frame multiplexer 6 forms multiple frames. Thereafter, the frame multiplexer 6 sends back the synthetic image signal to the video selector 5.

In this frame synthesis, the controller 7 measures the utterance times/non-utterance times of the participants in the conference on the basis of the signals from the audio mixer 4, and controls the video selector 5 to select the image signals from the CODECs $1_1$ to $1_n$ by the number of constituent frames as multiple frames in accordance with the measured utterance times.

The synthetic image signal sent back to the video selector 5 is output to the multiplexers $3_1$ to $3_n$. The multiplexers $3_1$ to $3_n$ multiplex this signal with the mixed speech signal from the audio mixer 4, and send back the resultant signal to the CODECs $1_1$ to $1_n$. Each of the CODECs $1_1$ to $1_n$ performs conference speech output and multi-image display operations on the basis of the sent speech and image signals.

A specific CODEC to which the synthetic image signal is to be transmitted may be determined under the control of the controller 7. More specifically, instead of transmitting a common synthetic image signal to all the CODECs $1_1$ to $1_n$, the controller 7 may not transmit the common synthetic image signal to a CODEC which has transmitted a frame included in the synthetic frame, but may transmit, to the CODEC, a special synthetic image signal including a frame from another CODEC in place of the self-frame. The controller 7 can perform control to transmit an arbitrary synthetic frame or a single frame from an arbitrary CODEC to an arbitrary CODEC by controlling the video selector 5 in this manner.

Figure 2:
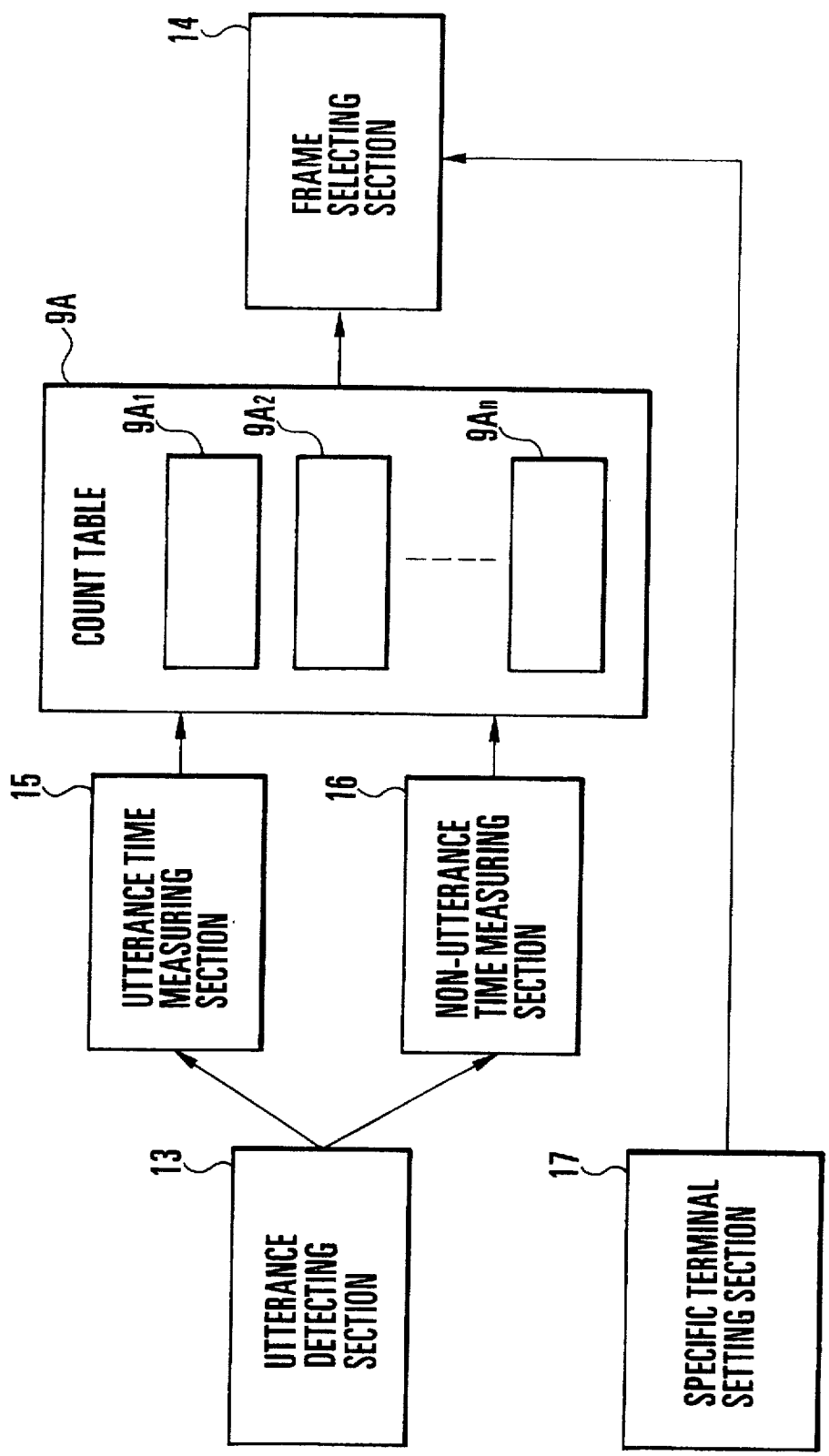
FIG. 2 is a block diagram showing the main part of the multipoint video conference system in FIG. 1.

FIG. 2 shows the main part of the video conference controller 2 in FIG. 1, specifically a functional block of the CPU 8.

Referring to FIG. 2, reference numeral 13 denotes an utterance detecting section for detecting the presence/absence of an utterance from each participant on the basis of the speech signals from the CODECs $1_1$ to $1_n$ through the audio mixer 4, and identifying the participant who is uttering; 9A, the counter table arranged in the memory 9 to store the utterance times of the participants as count values $9A_1$ to $9A_n$ correspondence with the CODECs $1_1$ to $1_n$; and 14, a frame selecting section constituted by the frame multiplexer 6 and the CPU 8 and adapted to form a multi-image signal for multiple frames by selecting image signals in accordance with the utterance times of the participants.

Reference numerals 15 and 16 respectively denote an utterance time measuring section and a non-utterance time measuring section for respectively measuring the utterance times and non-utterance times of the participants by using outputs from the utterance detecting section 13 and the timer 10; and 17, a specific CODEC setting section for setting specific CODECs such as chairperson and lecturer CODECs used by the chairperson and the lecturer in this video conference when the CPU 8 detects the operation of the console 12 through the serial I/O section 11.

A synthetic frame forming operation in the present invention will be described in more detail next with reference to this functional block. The utterance detecting section 13 always detects speech signals from the CODECs $1_1$ to $1_n$ and identifies one of the CODECs $1_1$ to $1_n$ through which the participant has made utterance. The utterance time measuring section 15 monitors for every unit time (e.g., one second) counted by the timer 10, on the basis of an output from the utterance detecting section 13, whether the utterance from one of the CODECs $1_1$ to $1_n$ which is identified as the speaker by the utterance detecting section 13 is continued. If it is determined upon monitoring that the utterance is continued, a corresponding one of the count values $9A_1$ to $9A_n$ of the count table 9A in the memory 9 is incremented one by one. If it is determined that the utterance is not continued, the corresponding count value in the count table 9A is kept unchanged.

When the utterance detecting section 13 detects that the utterance from the CODEC identified as the speaker is interrupted, the non-utterance time measuring section 16 starts to measure the utterance interruption time of the CODEC identified as the speaker. If no utterance is detected for a predetermined period of time (e.g., 10 seconds during which the participant is listening to an utterance from another participant) or more counted by the timer 10, one of the count values $9A_1$ to $9A_n$, in the count table 9A, which corresponds to the CODEC identified as the speaker is decremented one by one for every unit time (e.g., one second) counted by the timer 10 until utterance is detected again. In this manner, the relative utterance times of the respective participants are written in the count table 9A.

The frame selecting section 14 always refers to the count values $9A_1$ to $9A_n$ of the count table 9A, and selects image signals from the CODECs in the order of increasing count values, thereby performing display control for a multiple synthetic frame. With this operation, the image signals from the CODECs $1_1$ to $1_n$ are selected in accordance with the utterance times of speakers, and the constituent frames of a multiple synthetic frame are automatically changed.

In this case, the frame selecting section 14 selects the image signals from the chairperson and lecturer CODECs set by the specific CODEC setting section 17 in preference to the image signals from the remaining CODECs regardless of the count values, thereby performing display control to display the selected images at specific positions in multiple frames.

In the above embodiment, the controller 7 and the utterance detecting section 13 are designed to detect the presence/absence of utterances from participants in a conference and identify a CODEC as a speaker. However, detection of the presence/absence of utterances from participants in a conference and identification of a CODEC as a speaker can be performed by using hardware such as a speech detector and the like.

The timer 10 is used both for counting an utterance detection period and for counting a predetermined period of time as a non-utterance time. However, dedicated timers may be used for the two functions, respectively.

As has been described above, according to the present invention, image signals from CODECs are automatically selected and synthesized into multiple frames in accordance with utterances from participants in a conference. If, therefore, the number of CODECs exceeds the number of multiple frames, image signals from CODECs can be automatically synthesized without imposing any operation load on the operator of each CODEC.

In addition, since image signals from conference CODECs are selected and synthesized in the order of increasing count values as measured values of the utterance times of participants, the constituent frames of a multiple synthetic frame can be simply and efficiently selected.

Furthermore, since image signals from specific conference CODECs used by the chairperson, lecturer, and the like of a conference are preferentially displayed, smooth conference management can be realized.

What is claimed is:

1. A multipoint video conference system comprising a plurality of conference terminals, said conference terminals located at remote points which correspond to participants in a conference, for transmitting/receiving speech and image signals to/from the participants, and a video conference controller for controlling transmitting/receiving of speech utterance signals and image signals through said conference terminals, said video conference controller comprising:

speech synthesizing means for forming a synthetic speech signal by synthesizing speech utterance signals received from said conference terminals;

identifying means for detecting said speech utterance signals from said conference terminals, identifying said conference terminal through which one of said participants has made a speech utterance and producing an identification result;

wherein said identifying means comprises utterance detecting means for detecting the presence/absence of a speech utterance signal from each of said conference terminals by monitoring said speech utterance signal therefrom;

utterance time measuring means for measuring an utterance time of the speech utterance of said one of said participants whose utterance is detected by said utterance detecting means;

memory means for storing utterance times measured by said utterance time measuring means in correspondence with said conference terminals; and non-utterance time measuring means for measuring a non-utterance time of said one of said participants whose speech utterance has been detected by said utterance detecting means and for subtracting the measured non-utterance time from the utterance time stored in said memory means, wherein said non-utterance time measuring means measures said non-utterance time when said non-utterance time is greater than a predetermined time period, and wherein said multi-image signal contains image signals from said conference terminals which are selected in the order of increasing utterance times stored in said memory means;

frame selecting means for forming a multi-image signal, said multi-image signal comprising a number of image signals equal to a number of multiple frames contained in the image signals of said conference terminals, said number of image signals corresponding to said identification result so that image signals from conference terminals through which said one of said participants making a speech utterance is included in said multi-image signal; and transmission/reception means for receiving the speech utterance signals and image signals from said conference terminals and transmitting the synthetic speech signal from said speech synthesizing means and the multi-image signal from said frame selecting means to said conference terminals.

2. A multipoint video conference system according to claim 1, wherein said memory means includes a count table for storing count values indicating said utterance times; and wherein said utterance detecting means detects the presence/absence of a speech utterance from each participant and identifies the participant who is making said speech utterance; and wherein said utterance time measuring means increments a first count value which corresponds to one of said conference terminals corresponding to said one of said participants who is uttering, said first count value being incremented by one for every unit time in accordance with an utterance detection output from said utterance detecting means, and wherein said non-utterance time measuring means decrements said first count value by one for every unit time after no speech utterance from said one of said participants is detected for a predetermined period of time.

3. A multipoint video conference system according to claim 1 further comprising setting means for setting a specific conference terminal of said conference terminals, and wherein said frame selecting means preferentially selects an image signal from said specific conference terminal and forms a multi-image signal regardless of the identification result obtained by said identifying means.

4. A multipoint video conference system comprising a plurality of conference terminals, located at remote points which correspond to participants in a conference, for transmitting/receiving speech and image signals to/from the participants, and a video conference controller for controlling transmitting/receiving of speech utterance signals and image signals through said conference terminals, said video conference controller comprising:

speech synthesizing means for forming a synthetic speech signal by synthesizing speech utterance signals from said conference terminals;

image selecting means for selecting a plurality of image signals for constituent frames from said image signals, the multiple frames being constituted by a plurality of constituent frames obtained by dividing a single frame;

image synthesizing means for forming a multi-image signal from multiple frames by using the plurality of image signals selected by said image selecting means;

control means for controlling said image selecting means in accordance with a length of a speech utterance made by one of said participants through one of said conference terminals; and multiplexing means for receiving and separating multiplexed speech and image signals from said conference terminals, and transmitting said synthetic speech signal from said speech synthesizing means and said multi-image signal from said frame selecting means to said conference terminals upon multiplexing the signals; wherein said control means comprises, utterance detecting means for detecting the presence/absence of speech utterances from the participants, utterance time measuring means for measuring an utterance time of the speech utterance of one of said participants who has made said speech utterance, in accordance with an utterance detection output from said utterance detecting means, and a non-utterance time measuring means for measuring a non-utterance time of the one of said participants who has made utterance, in accordance with a non-utterance detection output from said utterance detecting means, and wherein said control means controls said image selecting means in accordance with said utterance time and said non-utterance time.

5. A multipoint video conference system according to claim 4, further comprising:

memory means for storing count values, each count value corresponding to a number of predetermined detection periods measured for one of said utterance times, said one of said utterance times corresponding to said one of said participants, wherein said utterance detecting means detects the presence/absence of utterances from the participants and identifies which of said participants is making said speech utterance, and wherein said utterance time measuring means monitors an utterance detection output from said utterance detecting means and increments one of said count values which corresponds to said conference terminal corresponding to said one of said participants who is making said speech utterance for each predetermined detection period when speech utterance is detected, and wherein upon receiving an utterance detection output, said non-utterance time measuring means monitors said utterance detection output from said utterance detecting means after no speech utterance made by said one of said participants is detected for a predetermined period of time, and decrements said one of said count values when no speech utterance is detected, and wherein said control means controls said image selecting means in accordance with the count values in said memory means.

6. A multipoint video conference system comprising a plurality of conference terminals, located at remote points which correspond to participants in a conference, for transmitting/receiving speech and image signals to/from the participants, and a video conference controller for controlling transmitting/receiving of speech utterance signals and image signals through said conference terminals, said video conference controller comprising:

speech synthesizing means for forming a synthetic speech signal by synthesizing speech utterance signals received from said conference terminals;

identifying means for detecting said speech utterance signals from said conference terminals, identifying said conference terminal through which one of said participants has made a speech utterance and producing an identification result;

measuring means for measuring an utterance time of every participant in a conference, from the beginning of the conference to a current time, and measuring a non-utterance time of every participant from the beginning of the conference to the current time;

frame selecting means for forming a multi-image signal by selecting a number of image signals equal to a number of multiple frames from the image signals of said conference terminals in order of value obtained by subtracting a measured non-utterance time from a measured utterance time; and transmission/reception means for receiving the speech utterance signals and image signals from said conference terminals and transmitting the synthetic speech signal from said speech synthesizing means and the multi-image signal from said frame selecting means to said conference terminals.

7. A multipoint video conference system according to claim 6, wherein said measuring means comprises utterance time measuring means for measuring an utterance time of the speech utterance of said one of said participants whose utterance is detected by said identifying means;

memory means for storing utterance times measured by said utterance time measuring means in correspondence with said conference terminals; and non-utterance time measuring means for measuring a non-utterance time of said one of said participants whose speech utterance has been detected by said utterance detecting means and for subtracting the measured non-utterance time from the utterance time stored in said memory means, wherein said non-utterance time measuring means measures said non-utterance time when said non-utterance time is greater than a predetermined time period, and wherein said multi-image signal contains image signals from said conference terminals which are selected in the order of increasing utterance times stored in said memory means.

8. A multipoint video conference system comprising a plurality of conference terminals, located at remote points which correspond to participants in a conference, for transmitting/receiving speech and image signals to/from the participants, and a video conference controller for controlling transmitting/receiving of speech utterance signals and image signals through said conference terminals, said video conference controller comprising:

speech synthesizing means for forming a synthetic speech signal by synthesizing speech utterance signals from said conference terminals;

measuring means for measuring an utterance time of every participant in a conference, from the beginning of the conference to a current time, and measuring a non-utterance time of every participant from the beginning of the conference to the current time;

image selecting means for selecting a plurality of image signals for constituent frames from said image signals, multiple frames being constituted by a plurality of constituent frames obtained by dividing a single frame;

image synthesizing means for forming a multi-image signal from multiple frames by using the plurality of image signals selected by said image selecting means;

control means for controlling said image selecting means in accordance with said utterance time of one of said participants through one of said conference terminals; and multiplexing means for receiving and separating multiplexed speech and image signals from said conference terminals, and transmitting said synthetic speech signal from said speech synthesizing means and said multi-image signal from said frame selecting means to said conference terminals upon multiplexing the signals.

9. A multipoint video conference system according to claim 8, wherein said measuring means comprises, utterance time measuring means for measuring an utterance time of the speech utterance of one of said participants who has made said speech utterance, in accordance with an utterance detection output from said utterance detecting means, and non-utterance time measuring means for measuring a non-utterance time of the one of said participants who has made utterance, in accordance with a non-utterance detection output from said utterance detecting means, and wherein said control means controls said image selecting means in accordance with said utterance time and said non-utterance time.

10. A multipoint video conference system according to claim 6, wherein said identifying means comprises:

utterance detecting means for detecting the presence/absence of a speech utterance signal from each of said conference terminals by monitoring said speech utterance signal therefrom.

* * * * *